FREDRICK W. VOIGT, JR.
ALAN E. LEWIS
INVENTORS

FREDRICK W. VOIGT, JR.
ALAN E. LEWIS
*INVENTORS*

BY William J. French
Malcolm H. Dunn
ATTORNEYS

United States Patent Office 3,651,125
Patented Mar. 21, 1972

3,651,125
CONTINUOUS METHOD FOR FORMATION OF A LIQUID MONOMER FOR A CONDENSATION POLYMER
Alan E. Lewis and Frederick W. Voight, Jr., Kingsport, Tenn., assignors to Eastman Kodak Company, Rochester, N.Y.
Filed Aug. 12, 1968, Ser. No. 752,057
Int. Cl. C07c 69/82
U.S. Cl. 260—475 P                 5 Claims

ABSTRACT OF THE DISCLOSURE

An improved method in which a liquid comprising a precursor for a condensation polymer monomer, such as the monomer, bis($\beta$-hydroxyethyl)terephthalate, is reacted in a succession of zones by the addition in each zone of a heated vapor such as ethylene glycol vapor, which vapor condenses in part as the formation of monomer occurs, thereby providing heat to the liquid and combining with the liquid for reacting with the unreacted portion of the precursor, the remaining uncondensed portion of the precursor, the remaining uncondensed portion of the vapor in each zone sweeping the reaction byproducts from each zone without allowing the byproducts to enter any of the other zones and thus come into contact with the liquid in any such other zones.

---

This invention relates to a method for continuous esterification, and is particularly directed to an improved method for completing the esterification reaction of a liquid material initiated by one or more preceding reactors, which method is intermediate to an overall process for ultimately producing a condensation polymer that may be used for making polyester fibers and the like.

In the instance of a polyester reaction such as a continuous alcoholysis of dimethyl terephthalate with ethylene glycol in the presence of suitable catalysts so as to obtain essentially complete conversion of the methyl ester, it is sometimes desirable or even necessary to perform the ester exchange reaction in more than one reactor because of different temperatures and pressures that may be necessary to employ. The invention therefore relates to a method by which the esterification of a liquid material is substantially completed. The word esterification is used in its broad sense to include both direct esterification of an acid with a hydroxyl compound and ester exchange of an ester with a hydroxyl compound to form a different ester.

An object of the invention is to provide an improved method for substantially completing the formation of a liquid monomer for a condensation polymer by admixing a heated vapor with a liquid comprising a precursor for the liquid monomer in a plurality of successive zones for reaction therein of the unreacted portion of the precursor, the heated vapor imparting heat to each zone for promoting the reaction therein, a part of the vapor condensing to liquid to supply the heat of vaporization of the reaction byproduct and the remaining uncondensed heated vapor serving to sweep the vaporous byproduct from the liquid in each zone.

Another object is to provide an esterification process by means of which the reaction temperature can be controlled by controlling reaction pressure so that the temperature can thereby be kept at a sufficiently low level at which the more rapid esterification reaction is adequately completed and less rapid byproduct reactions of reactants, such as conversion of ethylene glycol to diethylene glycol, are kept at low levels.

A further object is to provide an esterification process adapted to augment the driving force for the desired esterification reaction by reducing to a low level the concentration of volatile reaction byproduct in the liquid reaction medium.

Still another object is provide an esterification process whereby heat of reaction is supplied solely by direct heat exchange of the reaction medium with heated feed streams and almost entirely by such exchange with a condensing reactant vapor feed.

Other objects inherent in the nature of the invention will become apparent to those skilled in the art to which this invention pertains from the drawings and description in the specification.

Figure 1:
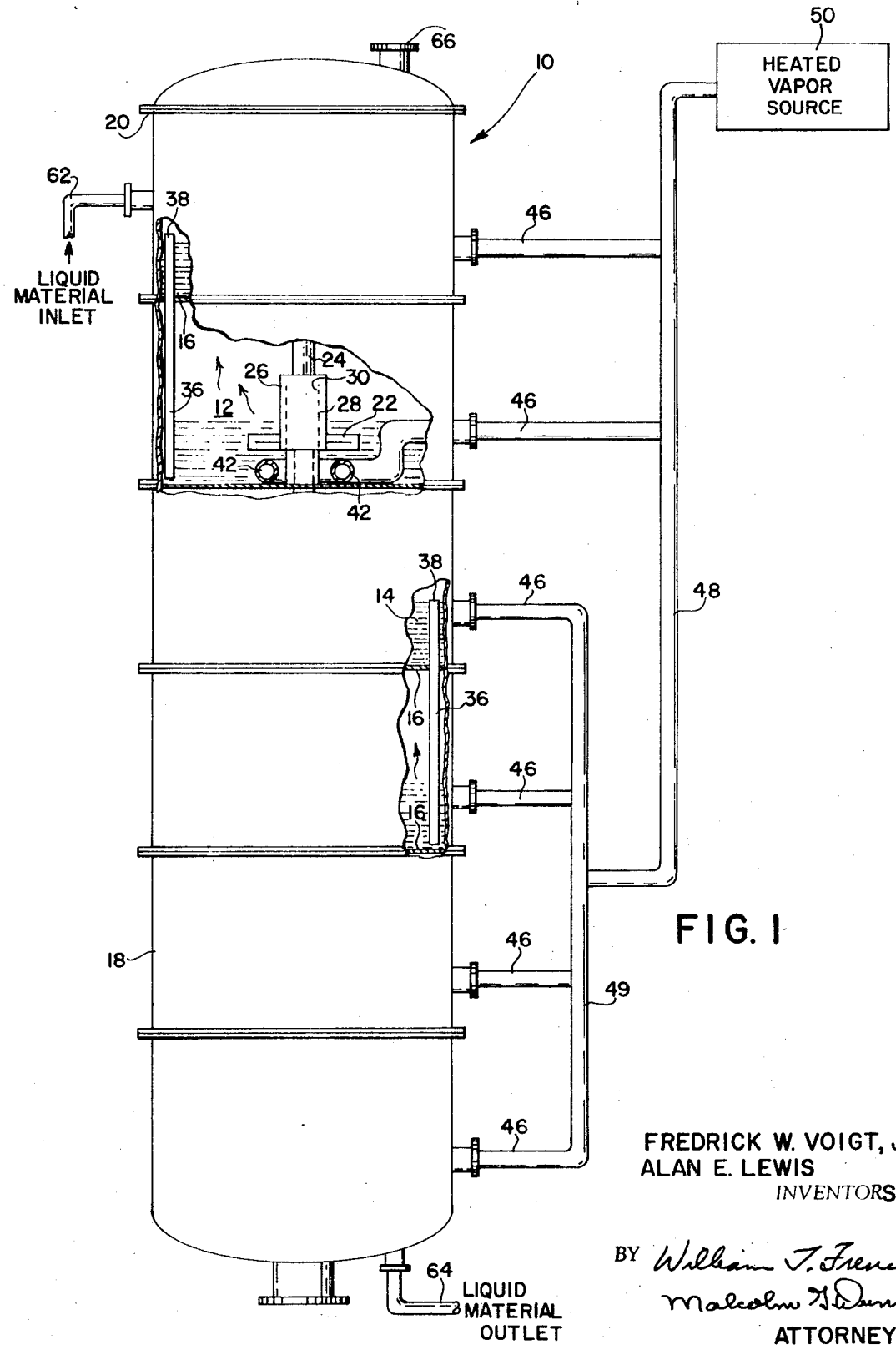
FIG. 1 is an elevational view of the vertically disposed, non-jacketed cylindrical reactor vessel with portions of the outer wall removed to illustrate the interior of separate reaction chambers and the disposition of some of the structural components in the chambers.
Figure 4:
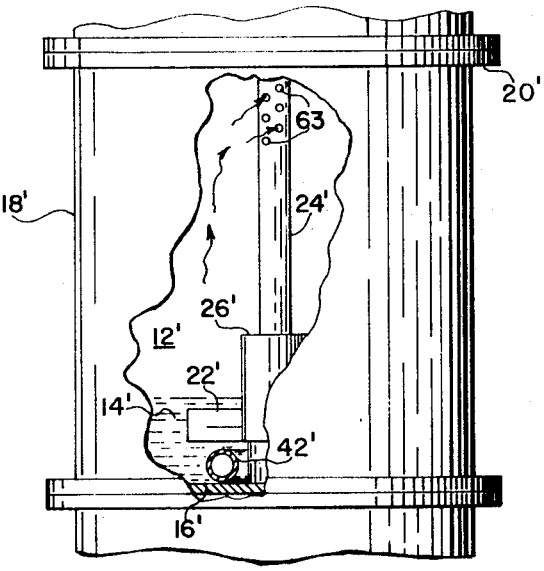
Figure 3:
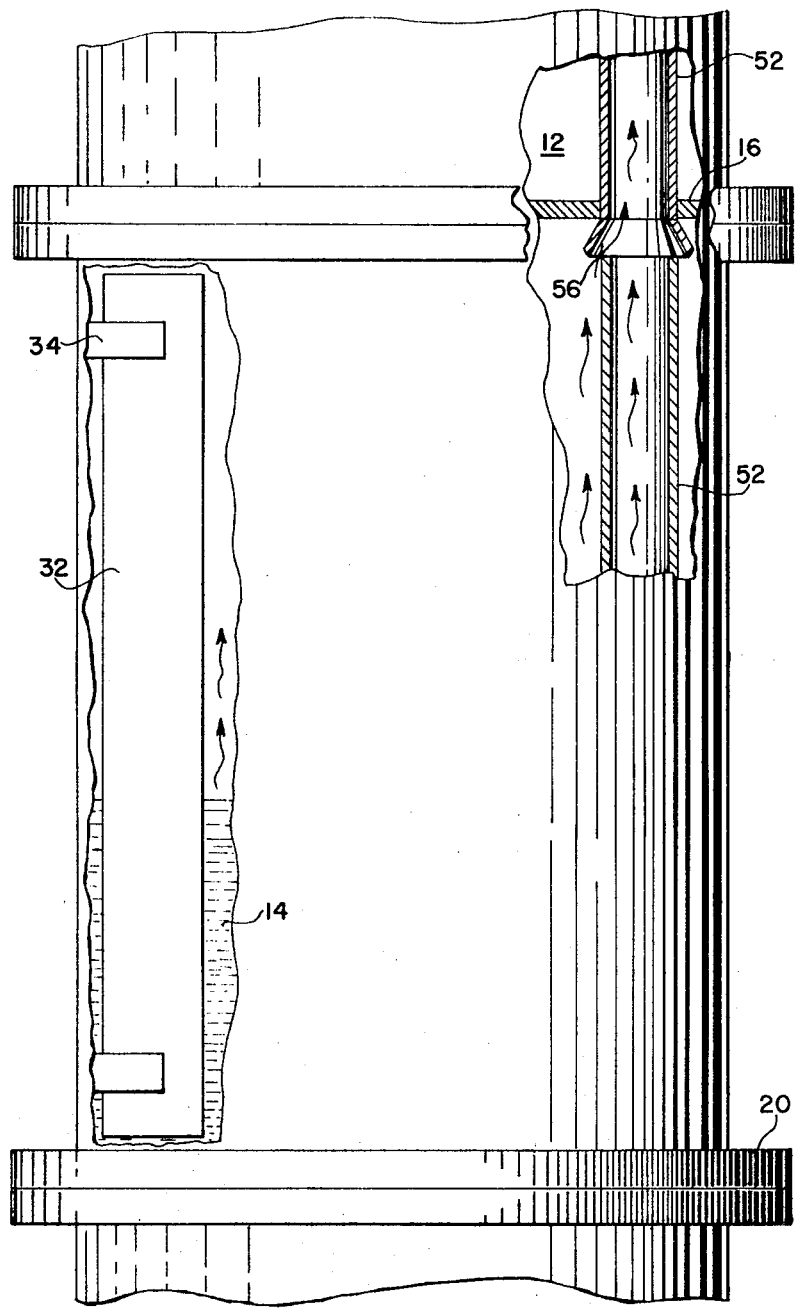

FIG. 3 is a further enlarged view of a portion of the reactor vessel with the outer wall of the vessel being broken away at two different locations to illustrate the disposition of the upcomers and a baffle member, the reactor vessel being rotatingly oriented to a position different from that illustrated in FIG. 1; and FIG. 4 is a view similar to that illustrated in FIG. 3 but of a different embodiment illustrating the use of the impeller shaft for an upcomer.

The method of the invention is thus directed to substantially completing the formation of a liquid monomer for a condensation polymer by continuously feeding a liquid comprising a precursor for the monomer into the first of a plurality of successive zones for reaction therein, separately introducing in each zone and admixing with liquid therein a heated vapor which condenses in part as the formation of monomer occurs, thereby providing heat to the liquid and combining with the liquid for reacting with the unreacted portion of the precursor and evolving a vaporous by-product, the remaining uncondensed portion of the vapor in each zone being adapted to sweep the vaporous by-product from said liquid in the zone and to establish in the liquid phase of each zone a low concentration of the evolved by-product, removing from each zone the vaporous by-product and uncondensed portion of the heated vapor, and then flowing the liquid from one zone to the next as it exceeds a predetermined liquid level in each zone until reaction thereof to monomer has been substantially completed. The temperature in each of the zones is maintained constant and equal to the temperature in each of the other of the zones by (1) maintaining each of the zones at a super-atmospheric pressure equal to that maintained in each of the other of the zones and (2) supplying heat to the zones solely by the introduction of the reactants into the zones and (3) supplying an excess of the vapor reactant to each of the zones, that is to say, at sufficiently high rate and temperature that no more than a portion of the vapor reactant is condensed in the zone in which it is introduced.

The word precursor as used above not only applies to the liquid dimethyl terephthalate used in the example given in this application, but may also, in the broad class of reactants, be a solution or slurry of a normally solid acid such as terephthalic acid in liquid ethylene glycol.

In reference to the drawings the cylindrical reactor vessel is indicated at 10, the long axis of the vessel being vertically disposed. The reactor vessel is non-jacketed, which means that the walls of the vessel are not provided with a heating arrangement for imparting heat for promoting chemical reaction in the vessel because such heat is to be provided by one of the entering reactants. The vessel is, in the overall system (not shown) of producing polyester, one of several differently constructed reactors each serving a different purpose and through each of which a liquid material will pass and be reacted until the ultimate condensation polymer is achieved.

Reactor vessel 10 has a plurality of separate reaction chambers 12, each of which is a stage in the treatment and reaction of the liquid 14 which is to be passed through the vessel. The reaction chambers 12, are disposed along the long axis of the vessel one above another and are separated from each other by spaced trays 16 that are horizontally positioned and suitably secured as by welding to the wall of the vessel. The vessel may be constructed in cylindrical sections 18 to be suitably joined together by flanges 20.

Each reaction chamber 12 is provided with mechanical agitation means in the form of an impeller 22 that is connected to a common impeller shaft 24 that extends through all of the reaction chambers. In order to prevent the liquid material from passing downwardly along the shaft from one reaction chamber to another, the hub 26 of the impeller sealingly cooperates with and is disposed over an annular collar 28 that extends from the floor of the tray and through the opening 30 of the collar the shaft passes upwardly therethrough. The impeller rotates in one direction, thus the resulting swirling liquid material will be aided in the agitation by baffle members 32 (FIG. 3) at least two being in each chamber and supported from the wall of the chamber by supports 34.

Figure 2:
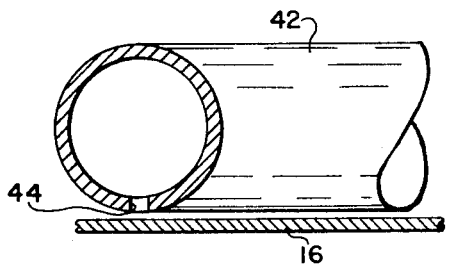
FIG. 2 is an enlarged view of a portion of the tray and sparging ring and also illustrates the sparging aperture location in the sparging ring.

Each reaction chamber 12 is further provided with portions of two downcomers 36, the upper end of one of the downcomers forming a weir 38 that establishes the level of the liquid material in the reaction chamber. The downcomers are so arranged that the upper end of one downcomer will be located in one reaction chamber while the lower portion of the same downcomer will extend through the floor of the tray and into the reaction chamber below. A sparging ring 42 is disposed around the annular collar 28 between the impeller 22 and the floor of the tray 16, and is provided with apertures 44 (FIG. 2) spaced around the lower surface of the ring and through which the heated ethylene glycol vapor is to be introduced into the reaction chamber. The sparging ring is connected to a sparge pipe 46 that extends through the wall of the reaction chamber. The sparge pipes 46 from the upper two reaction chambers 12 are connected to a common header 48 that leads to a heated vapor source, such as ethylene glycol vapor, indicated schematically at 50. The sparge pipes 46 from the lower four reaction chambers 12 are connected to a separate header 49 which in turn is connected to the common header 48 for purposes to be discussed later.

Each reaction chamber 12 further includes an upcomer 52 (FIG. 3), the lower end of which extends through the floor of the tray and is provided with a diverging opening 56 that opens into the reaction chamber below. The upper end of the upcomer in the reatcion chamber below is slightly spaced from the diverging opening 56 of the upcomer from the reaction chamber above, the upcomers being arranged to receive but not emit vapors.

In the operation of the reaction vessel 10, a precursor liquid feed is introduced through inlet 62 located at the upper end of the vessel, and after passing through all of the reaction chambers 12 is subsequently passed out of the reactor vessel through an outlet 64 that is located at the lower end of the vessel. The entering liquid feed or liquid reaction precursor for the liquid monomer, as previously indicated, may be the product of one or more preceding reactors (not shown); and the purpose of the reactor vessel 10 is to substantially complete the formation of the liquid monomer that was initiated in such one or more preceding reactors.

The reactor vessel 10 thus achieves the above-indicated purpose by chemically reacting material in the flowing liquid stream in each of a succession of stages or reaction chambers 12 with additional amounts of ethylene glycol, and provides for the reaction by-products, primarily methanol, to be removed from each of the stages in such manner as to prevent the reaction by-products from coming into contact with and thus undergoing reverse reaction with reaction products in the liquid stream in any of the other stages or reacting in such manner as to undesirably form diethylene glycol (DEG), the presence of which would impart undesirable properties in the ultimate polyester product.

The liquid continuously flows into the uppermost reaction chamber 12, and upon reaching the height of the weir 38 flows down through the downcomer 36 to the next reaction chamber for subsequent reaction. Heat for the reaction in each reaction chamber is provided by the introduction through the sparging ring 42 of a heated vapor such as ethylene glycol vapor as in the above example. The impeller 22, baffle members 32, downcomers 36 and upcomer 52, as part of the mechanical agitation components, cooperate to assure intimate contact of the heated ethylene glycol vapor with the liquid material in each reaction chamber.

The reactor vessel is normally under super-atmospheric pressure, which, for example, in the reaction of dimethyl terephthalate with ethylene glycol is suitably in the range of approximately 4 to 31 pounds per square inch gauge. The temperature can be controlled by controlling the pressure and will be held substantially constant and substantially equal in each reaction zone. For reaction of dimethyl terephthalate with ethylene glycol at the pressures indicated, the reaction temperature will, for example, be in the range of 205° C. to 240° C. It should be understood however that the method and apparatus of the invention can operate over wide ranges of pressures and temperatures suitable for esterification reactions.

The heat from the ethylene glycol vapor introduced into the chamber serves to promote the reaction taking place in the liquid material, and as the methanol is driven from the liquid material the cooling effect of the evaporation of the methanol condenses some of the ethylene glycol vapor which then becomes a part of the liquid reaction material to cause a further reaction of the unreacted dimethyl terephthalate in the liquid material. Thus, it is necessary to assure that the ethylene glycol vapor is introduced into each reaction chamber in sufficient amounts as to assure an excess of vapor beyond that part of the vapor which condenses into a liquid in order that the uncondensed ethylene glycol vapor may in turn serve to strip the methanol and other vaporous reaction by-products from the reaction chamber.

Since more of the reaction occurs in the upper two reaction chambers than in the latter four reaction chambers, illustrated by the particular reactor vessel disclosed, more heated ethylene glycol is required in these upper chambers than in the lower chambers. Therefore, in order to exert a better control over the reaction occurring throughout the vessel the heated ethylene glycol vapor is controllably fed to the upper two reaction chambers through sparge pipes 46 from the common header 48, while a separate header 49 coming from the common header 48 provides the heated ethylene glycol vapor to the lower four reaction chambers.

The reaction by-products, which include primarily methanol, ethylene oxide, some diethylene glycol, perhaps a small amount of water vapor and traces of other chemicals such as acetaldehyde, methyl-Cellosolve, dioxolane, etc., are swept by the ethylene glycol vapor into the diverging opening 56 in the upcomer for passage from the reaction chamber. The overall arrangement of the upcomers 52 is such that the reaction by-products will pass upwardly through the length of the reactor vessel and through the vapor outlet 66 at the upper end of the vessel without the reaction by-products coming into contact with the liquid material in any of the other stages. In FIG. 4 an alternate arrangement is disclosed wherein the primed reference numbers refer to structures similar to those structures previously discussed but wherein the impeller shaft 24' is hollow and serves as an upcomer with the reaction by-product passing into the hollow shaft through apertures 63 located in the upper part of each reaction chamber and above the liquid level. An important advantage obtained by these upcomer arrangements being located within the reactor vessel is that the heat within the reactor vessel keeps the upcomers from plugging up, thus eliminating the possible impeding of the upward flow of the vaporous reaction by-products. This is a saving over a construction whereby the upcomer from each reaction chamber, if extended directly outwardly from the reaction chamber through the wall of the reactor vessel, would have to be separately heated to assure non-plugging of the upcomer.

Although the reactor vessel 10 is not jacketed because the heat for the reaction is being provided by the heated vapor, it may be desirable from the standpoint of emergency to steam-trace the outside of the reactor vessel in the event of a temporary shutdown of the reactor. The reason for the steam-tracing is to prevent the liquid material from cooling and solidifying in the reactor. Another reason for not attempting to provide heat for the reaction from a jacketing arrangement is that the size of the reactor vessel would be such that it would not be commercially practical to impart heat to the liquid material in this manner. The reason for this is that as the size of the reactor vessel is increased to handle larger amounts of liquid material, there has been no corresponding increase of the wall surface of the vessel that could be used to impart heat to the increased volume so that a heated jacket would be inadequate in providing the necessary heat for promoting the reaction. For example, the reactor vessel illustrated is about 4½ feet in diameter and a little over 20 feet in length, and in each reaction chamber there is at any one time approximately 125 to 150 gallons of the liquid material.

The following example will point out the commercial significance of what is possible with the size of the reactor described above.

EXAMPLE

The liquid feed stream is introduced through inlet 62 at a rate of about 5360 pounds per hour and comprises about 22% ethylene glycol and 78% dimethyl terephthalate that has been about 50% reacted. The header 48 will supply to the sparge pipes 46 for the first and uppermost reaction chamber 1824 pounds per hour of the heated ethylene glycol vapor, and in the next succeeding reaction chamber 540 pounds per hour of such vapor. The lower four reaction chambers will receive respectively from the separate header 49 about 316 pounds per hour, about 268 pounds per hour, about 224 pounds per hour and about 188 pounds per hour. The liquid monomer product flowing out of the outlet 64 will be on the average of about 5640 pounds per hour. The vaporous by-products flowing from the vessel through the vapor outlet 66 will amount to about 3080 pounds per hour, some of the vapor including about 19% methanol and 81% ethylene glycol and other components in smaller amounts as previously indicated.

It should be apparent from the disclosure that the reactor vessel disclosed is capable of continuously handling and reacting the liquid material received from one or more preceding reactors in a manner to assure sufficient driving force of the reaction without permitting the reaction to go into equilibrium in any of the reaction chambers. For example, in one overall arrangement for producing a condensation polymer, the entering liquid material may be approximately 50% converted to monomer. The first reaction chamber is then intended to react half again as much or 75% of the unreacted dimethyl terephthalate with succeeding stages of the reaction each accomplishing half again as much of the reaction until from the sixth stage the liquid monomer leaving the reactor vessel will be substantially completely formed. Obviously, the invention is not limited to a reactor vessel or a process that includes only six stages for reaction because the number of reaction chambers would depend on the extent to which the entering liquid reaction precursor for the monomer had been previously reacted, as well as on other factors.

The process of the invention has been described in relation to the ester exchange reaction between dimethyl terephthalate and ethylene glycol. It should be understood however that the principles of the invention are applicable broadly to all types of esterification reactions, including direct esterification and ester exchange, in which a by-product is evolved, such as water or an alcohol, which is lower boiling than the reactants and the desired product. An example is the reaction of phthalic acid with 2-ethylhexanol to produce bis(2 - ethylhexyl)phthalate (also known as DOP) as the desired esterification product and water as the by-product which is removed from the reaction zone. Other examples include preparations of various esters and diesters by reaction of an acid or ester with an alcohol or glycol and evolving by-product water or a volatile alcohol boiling lower than the reactants and the desired product. The term monomer, as used herein and in the claims, is employed in its broadest sense to include products of condensation reactions without regard to whether they can be further polymerized and thus include DOP, as noted above, as well as other products of esterification reactions. We use the word esterification here and in the claims in its broad sense to include both direct esterification of an acid with a hydroxyl compound and ester exchange of an ester with a hydroxyl compound to form a different ester.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. A method for substantially completing the formation of a liquid monomer for a condensation polymer, said method comprising:
   continuously feeding a liquid comprising dimethyl terephthalate and glycol as a precursor for said monomer into the first of a plurality of successive zones for reaction therein and in each of which is established a predetermined liquid level;
   separately introducing in each zone and admixing with liquid therein a heated glycol vapor which condenses in part as the formation of monomer occurs, thereby providing heat to the liquid and combining with the liquid for reacting with unreacted portion of said precursor and evolving a vaporous by-product, the remaining uncondensed portion of the vapor in each zone being adapted to sweep the vaporous by-product from said liquid in the zone and to establish in the liquid phase of each zone a low concentration of said evolving by-product;
   removing from each individual zone said vaporous by-product and uncondensed portion of the heated vapor without allowing the vaporous by-product to enter any of the other zones and thus come into contact with the liquid in any such zones;
   maintaining the temperature in each of said zones constant and equal to the temperature in each of the other of said zones by (1) maintaining each of said zones at a superatmospheric pressure equal to that maintained in each of the other of said zones and (2) supplying heat to said zones solely by the introduction of the reactants into said zones and (3) supply- ing the vapor reactant to each of said zones at such a temperature and rate that no more than a portion of said vapor reactant is condensed in the zone in which it is introduced; and flowing liquid from one zone to the next as it exceeds the predetermined liquid level in each zone until reaction thereof to monomer has been substantially completed.

2. The method according to claim 1 and wherein the monomer is bis($\beta$ - hydroxyethyl)terephthalate and the heated vapor is ethylene glycol, and the temperature is from about 205° C. to 240° C. and the pressure is from about 4 to 31 pounds per square inch gauge.

3. The method as defined in claim 1, and wherein the heated vapor is introduced in each successive zone in lesser amounts than in each preceding zone.

4. The method as defined in claim 1, and wherein the monomer is bis($\beta$ - hydroxyethyl)terephthalate and the heated vapor is ethylene glycol.

5. The method as defined in claim 1, and wherein said liquid comprising said precursor is about 50 percent converted to monomer when fed to said first of a plurality of successive zones and each successive zone accomplishes about half as much of the ultimate reaction to monomer as the preceding zone.

References Cited
UNITED STATES PATENTS
| | | | |
|---|---|---|---|
| 2,905,707 | 9/1959 | Hurt et al. | 260—475 |
| 3,385,881 | 5/1968 | Bachmann et al. | 260—475 |

FOREIGN PATENTS
| | | | |
|---|---|---|---|
| 1,013,518 | 12/1965 | Great Britain | 260—475 P |

LORRAINE A. WEINBERGER, Primary Examiner

E. J. SKELLY, Assistant Examiner

U.S. Cl. X.R.

23—284; 260—75 M